United States Patent [19]

Roszkowski

[11] 4,445,315

[45] May 1, 1984

[54] DISPOSABLE CUTTING EDGE

[76] Inventor: Gregory J. Roszkowski, 621 Tanglewood Rd., Derby, Kans. 67037

[21] Appl. No.: 385,901

[22] Filed: Jun. 7, 1982

[51] Int. Cl.³ .................... A01D 55/18; A01D 75/18
[52] U.S. Cl. .................................... 56/295; 56/17.5; 116/67 R; 30/347; 408/710; 409/134
[58] Field of Search ........ 56/17.5, 295, 503, DIG. 17; 83/522; 408/710, 239 R, 11, 6 E; 409/134; 279/1 ME; 30/347; 46/66, 179; 116/67 R

[56] References Cited

U.S. PATENT DOCUMENTS

| 2,869,311 | 1/1959 | Beeston | 56/295 |
| 2,932,147 | 4/1960 | Beeston | 56/295 |
| 3,097,468 | 7/1963 | Johnson | 56/295 |
| 3,327,460 | 6/1967 | Blackstone | 56/295 |
| 3,388,540 | 6/1968 | Michaud | 56/295 |
| 3,563,015 | 2/1971 | Renfroe | 56/295 |
| 4,229,933 | 10/1980 | Bernard | 56/295 |

Primary Examiner—Robert Peshock
Assistant Examiner—John G. Weiss

[57] ABSTRACT

A disposable cutting edge to be installed upon a lawn mower rotor and an audible tone generator to warn the operator when the disposable cutting edge is not properly installed. A disposable cutting edge providing a quick and safe snap-on/snap-off installation/removal upon a specially constructed rotor containing an edge positioning sensor, and capable of generating an audible alarm.

9 Claims, 8 Drawing Figures

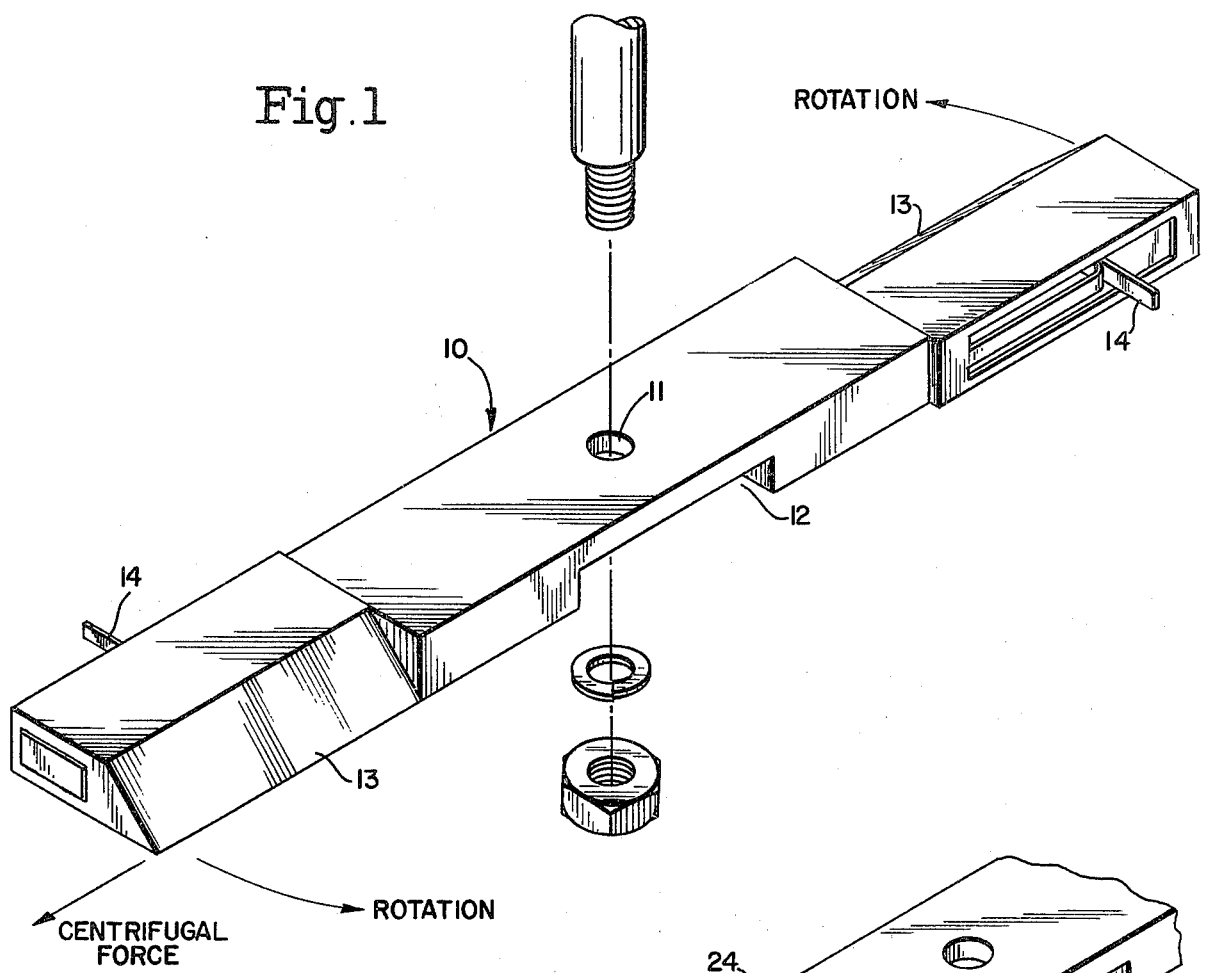
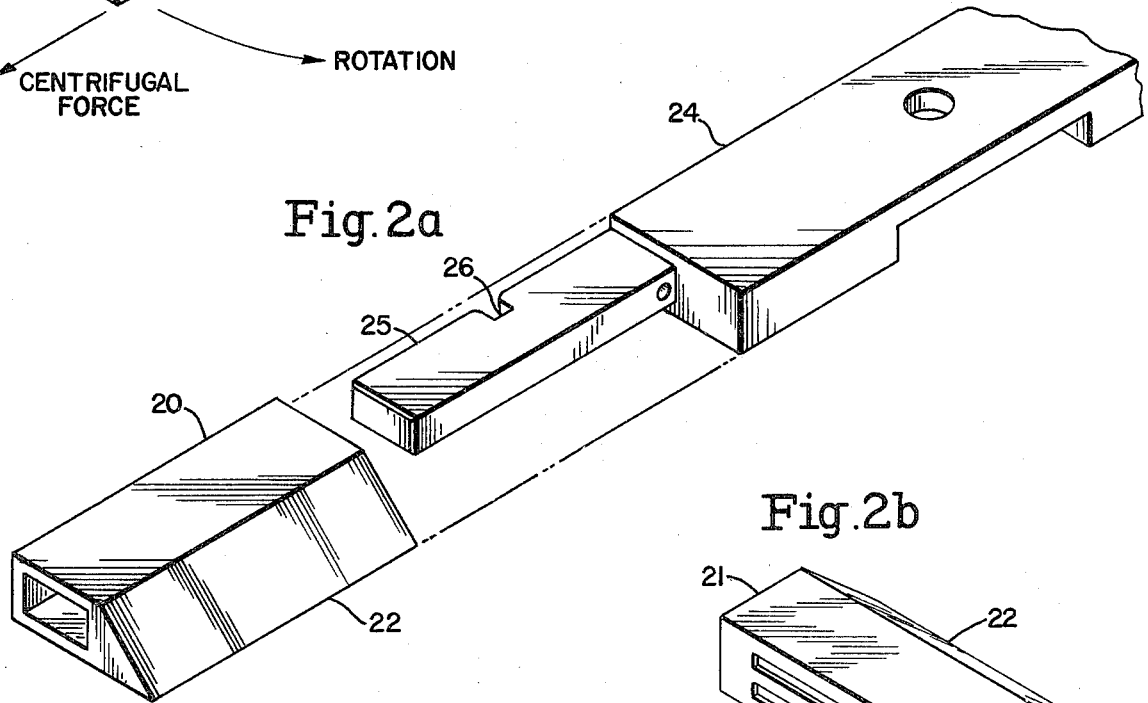
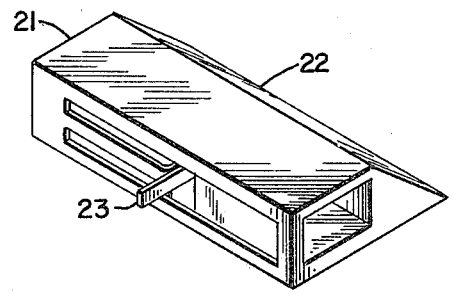

DISPOSABLE CUTTING EDGE

Disposable cutting edge system relates to the improvement of existing lawn mower and more particularly to a quick, easy, and safe removal/installation and operation of the rotary blade. The system is comprised of two component features which are: (1) Rotor and (2) Disposable Cutting Edge. Additionally, if used, an audible safety warning tone becomes the third feature of this invention. In the lawn mowers marketed today, the replacement of a rotary blade is both troublesome and dangerous. Typically, a mower needs to be placed in a vetical position (oil may spill). At this point the individual changing the blade must hold the blade (by the sharp end) while attempting to loosen the mounting nut. Usually the nut is very tight due to dirt accumulation and corrosion. Considerable force is required, thus eliminating weaker individuals from accomplishing this job. If the hand or the wrench slips while loosening the nut, an injury is likely to occur. In extreme cases, the blade may be inadvertantly turned far enough to actually start the engine and cause a serious injury. Removal/installation of a blade for the purpose of sharpening/balancing, usually takes place routinely at the beginning of each and every season and more often if the blade becomes dull from physical abuse such as striking a rock, etc.

The merits of this device are obvious as they are comparable to the commonly used shaver with disposable heads versus the old time straight edge razor that needed to be resharpened on a leather strap.

The principal object of this invention is to eliminate the need for replacing and balancing of a lawn mower blade through the use of a snap-on/snap-off disposable edge.

A second objective of this invention is to provide a safe, quick, and easy way of replacing a lawn mower blade without the use of tools or risk of personal injury.

A third objective of this invention is to render a safe lawn mower operation by providing an alarm if the disposable cutting edge is not properly installed, or shatters from striking an object such as a rock.

This invention is comprised of, but not limited to, two component features: (1) The Rotor; and (2) The Disposable Cutting Edge. Additionally, if used, an audible safety warning is the third integral feature.

One feature of this invention is the motor which is used upon initial installation only. It replaces the original rotary blade, except that the rotor is not equipped with cutting edges. It does, however, contain the alarm system which is discussed elsewhere. The rotor is prebalanced and has a universal mounting to accommodate many of the existing blade mounts. The rotor is fabricated by sturdy material and serves as a fly-wheel for the mower and as a base for installing disposable cutting edges (one on each end). Once installed, the rotor need never be replaced.

Another feature of this invention is the disposable cutting edge which can be made of any suitable material, and be of any shape, without limiting the scope of this invention. One such shape has been selected for purposes of this disclosure and is illustrated. The choice of materials and shape are strictly engineering decisions aimed at fulfilling the following requirements: (a) no special tools are required for installation/removal of disposable cutting edge, (b) an unskilled person can install/remove the disposable cutting edge without risk of personal injury.

The disposable cutting edge is a light weight device which is prebalanced when installed on the rotor. It has an edge which is, at least, as durable as presently used carbon steel blade, and is designed to stay sharp for one full season unless abused (striking a rock, etc.). The disposable cutting edge unit is also provided with a spring snap-lock mechanism, or some other means of positive attachment, to assure that it is properly installed and securely fastened. No shifting of position due to centrifugal force is possible. The mechanism illustrated in FIG. 4 shows a sequence where a sleeve-type disposable cutting edge slides unto the rotor and locks in position. For removal, the tab is pulled out of the way and the disposable cutting edge is slipped off the rotor.

A further feature is the alarm. There are one or more holes formed in the rotor in such a way that air passing through them generates an audible warning tone. During normal operation, these holes are covered by the disposable cutting edge and are not exposed to air. Thus, no tone is generated. If the disposable cutting edge is not properly positioned or is missing, however, the holes are exposed to the passage of air. As the rotor spins, and audible tone is generated warning the operator of an unsafe condition.

Further features and advantages of this invention will become apparent from the following specifications and illustrations.

FIG. 1 is an illustration of the disposable cutting edge system showing all components in an oblique view.

FIGS. 2a and 2b illustrate the disposable cutting edge in front and rear oblique views and one method of mounting the cutting edge on the rotor.

Figure 3:
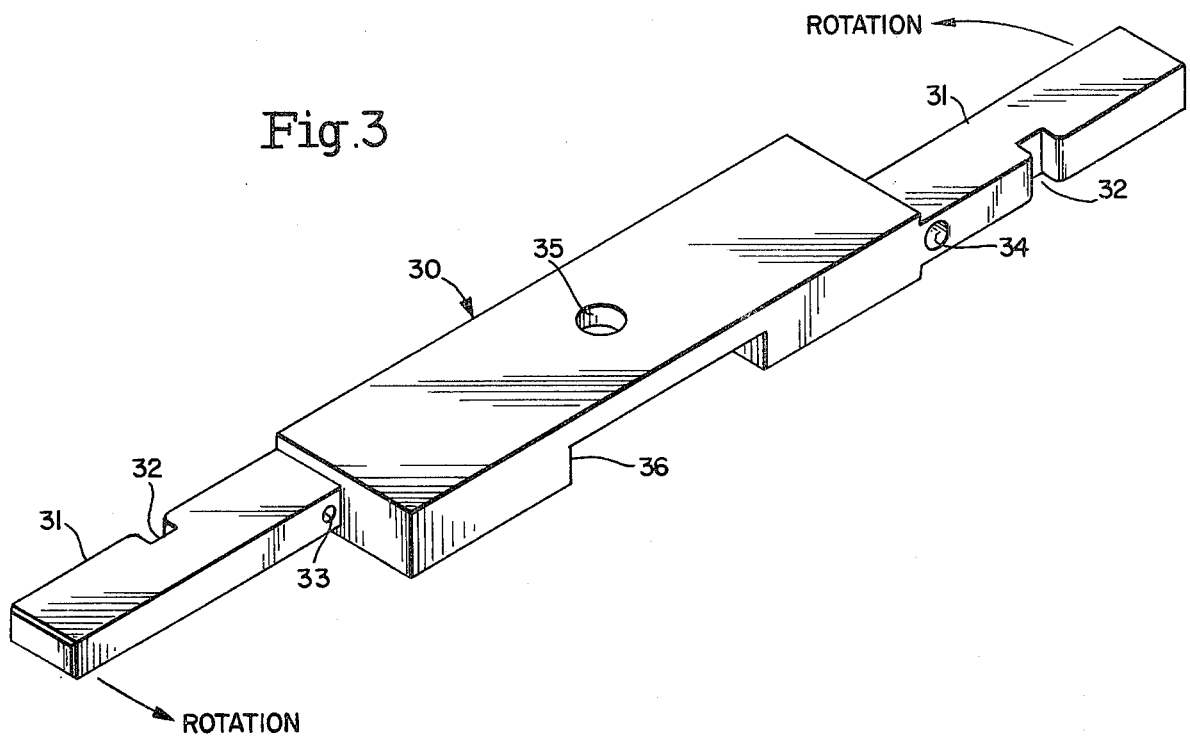
FIG. 3 is an illustration of the rotor shown in an oblique view.
Figure 4A:
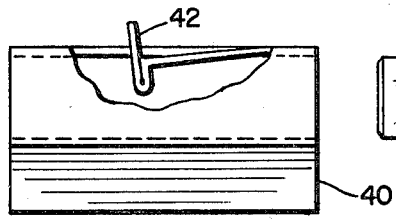
FIGS. 4a through 4d are a top view, partly in section, showing in three steps the sequence of events as the disposable cutting edge is installed upon the rotor.
Figure 4B:
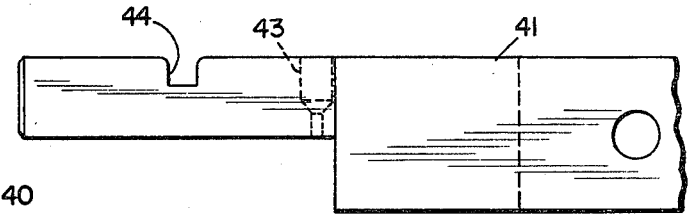
Figure 4C:
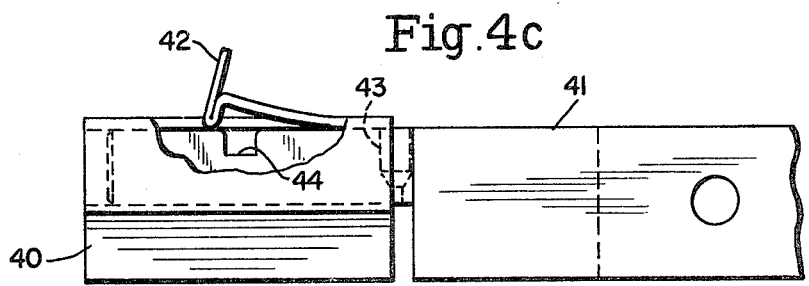
Figure 4D:
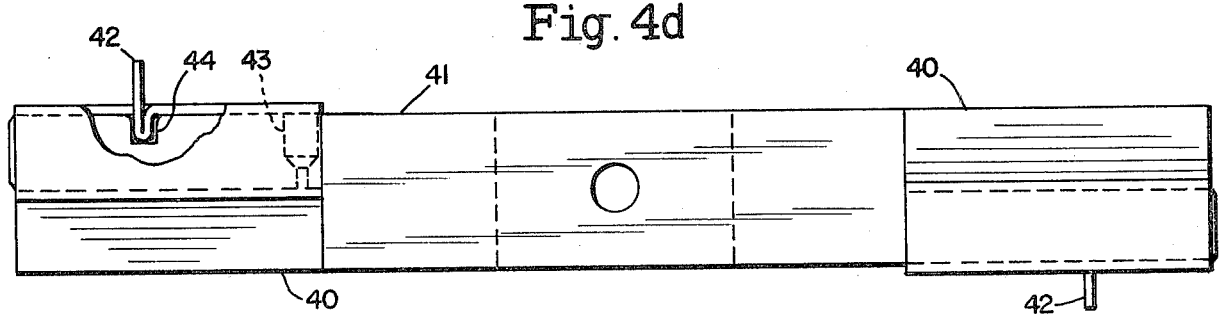

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Refer now to FIG. 1. An overall view of the disposable cutting edge system is illustrated completely assembled with an exploded view of mounting provisions to the lawn mower. The mounting provisions to the lawn mower are not part of this disclosure and are shown for reference only.

The rotor (10) is a prebalanced component part intended as a flywheel for the lawn mower engine, and for mounting two, one on each end, disposable cutting edges (13). The rotor also has a universal mounting provision (11) to fit many existing mowers. A cut-out (12) is provided to hide the mounting nut so that the lowest point is the cutting edge. On the rear wall of the disposable cutting edge (13) is a snap-lock mechanism (14) which prevents the disposable cutting edge from sliding off due to centrifugal force. For installation/removal of the disposable cutting edge, the tab (14) is simply pulled out and the edges slides on/off the rotor.

In the absence of applications invention, to remove a lawn mower blade it is necessary to jam the rotor blade and, using a wrench, unscrew the mounting nut. After the nut had been removed, the entire rotor-blade would be removed and either sharpened and balanced, or replaced with a new one. The shaft then would have to be jammed again in order to install the new blade and tighten the mounting nut.

In FIG. 2a, the disposable cutting edge is shown in a front oblique view and the rear oblique view is shown in FIG. 2b. The sharp edge (22) is also visible in two views. The snap-lock mechanism (23) is visible in FIG. 2b only. The dashed lines indicate an exploded view of the installation of the disposable cutting edge (20) on the rotor (24). During installation, the tab (23) is pulled out and the unit (20) is pushed along the arm (25) until the tab snaps into the cut out (26) which prevents any further motion. For removal, the procedure is reversed.

In FIG. 3, the rotor (30) is shown in a front oblique view. There are two arms (31) for mounting the disposable cutting edges with cut outs (32) for the snap-lock mechanism. The hole (33) is the air intake of the warning tone generator, and hole (34) is the air exhaust thereof. Because the intake hole is smaller than the exhaust hole, the air passing through the warning tone generator will make a whistling sound. When the rotor is not turning, or when the disposable cutting edges are properly installed, air passage is blocked and no tone is generated. The mounting hole (35) and nut provisions are not a part of this invention and are shown for reference only.

In FIG. 4, the sequence of events of installation/removal of a disposable cutting edge is shown in steps 4a thru 4d, as observed from a top view, partly in section. In FIGS. 4a and 4b, the disposable cutting edge (40) is ready for installation on the rotor (41). The snap-lock mechanism (42) is down and the warning tone generator (43) would generate an audible tone should the rotor start to spin. FIG. 4c shows the disposable cutting edge (40) partly assembled leaving the warning tone generator (43) open to the passage of air, thus generating an audible tone. The position of the snap-lock mechanism (42) is up inasmuch as the cut-out (44) is not lined up. FIG. 4d illustrates the disposable cutting edge (40) fully assembled and the snap-lock mechanism (42) securily locked within the cut-out (44). Air passage to the warning tone generator (43) is blocked and no sound can be generated.

The novel disposable cutting edge system disclosed herein is in no way to be limited to the particular disposable head and rotor illustrated. The size and shape of the component parts, the type of the warning tone generator, and the safety locking mechanism may be altered to suit conditions existing in particular applications not necessarily restricted to use in lawn mowers.

It will be appreciated that the disposable cutting edge system described may be used for many applications and is not to be limited to lawn mowers. For example, a disposable cutting edge for an axe.

What I claim as new and useful are described below in the following claims:

1. In a system intended for use as a cutting rotary device comprised of a rotor and one or more detachable blades securely attached upon the rotor by a locking mechanism, said rotor having a universal mounting provision for attaching to the rotating output of a power source and containing an audible alarm mechanism effective any time the detachable blade having a disposable cutting edge is not properly installed and locked in position.

2. In a system intended for use as a cutting rotary device in accordance with claim 1, said rotor to be equipped with provisions for attaching disposable cutting edges, one at each end, without affecting the balance of the assembly.

3. In a system intended for use as a cutting rotary device in accordance with claim 1, said rotor to be constructed with one or more cavities through which passage of air will generate an audible warning tone whenever the rotor is in motion without said disposable cutting edges installed.

4. In a system intended for use as a cutting rotary device in accordance with claim 1, disposable cutting edges to be constructed of high-impact, light-weight material and to be capable of installation upon a rotor without affecting the balance of the assembly.

5. In a system intended for use as a cutting rotary device in accordance with claim 1, disposable cutting edges to be mounted upon the rotor without the use of tools or special skill.

6. In a system intended for use as a cutting rotary device in accordance with claim 1, disposable cutting edges to be mounted upon the rotor in such a way as to prevent an audible warning tone from being generated.

7. In a system intended for use as a cutting rotary device in accordance with claim 1, will securily lock the said disposable cutting edge in place when it is properly positioned on the rotor.

8. In a system intended for use as a cutting rotary device in accordance with claim 1, mechanism to be constructed in such a manner as to prevent the disposable cutting edge from shifting position during operation due to centrifugal force or physical abuse.

9. In a system intended for use as a cutting rotary device in accordance with claim 1, said rotor is to be mounted in place of the existing rotary blade and to act as a prebalanced fly-wheel for the driving power source.

* * * * *